Aug. 17, 1943.   G. B. HIRSCH   2,327,109
MACHINE TOOL
Filed July 24, 1940
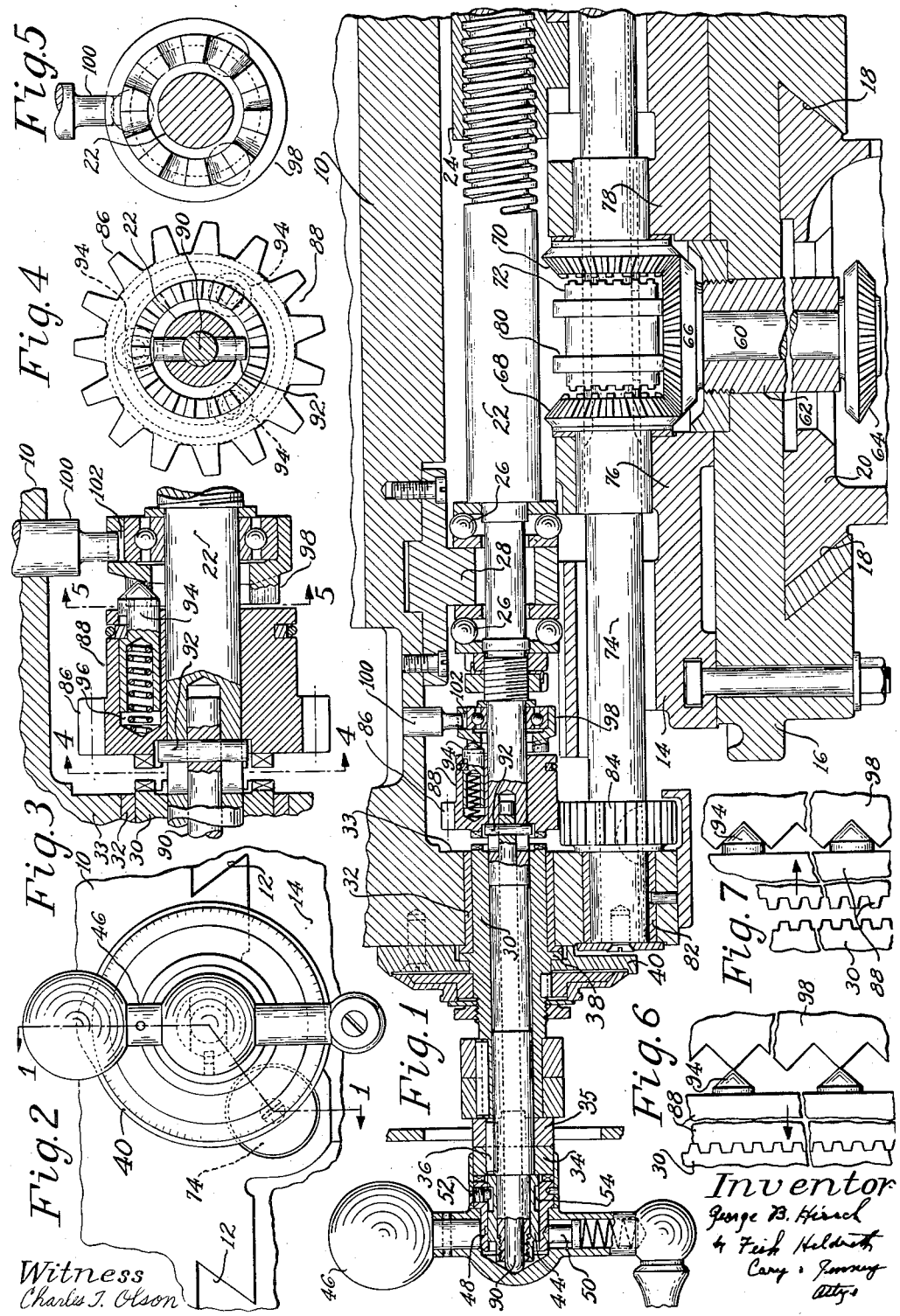
Inventor
George B. Hirsch Patented Aug. 17, 1943

2,327,109

UNITED STATES PATENT OFFICE 2,327,109

MACHINE TOOL

George E. Hirsch, Providence, R. I., assignor to Brown and Sharpe Manufacturing Company, a corporation of Rhode Island Application July 24, 1940, Serial No. 347,123

9 Claims. (Cl. 90—21)

The present invention relates to improvements in actuating mechanism for machine tool supports, and more particularly to an interlocking device for rendering one of two alternative manual and power operated driving connections for a machine tool support inoperative when the other of said driving connections is engaged.

The invention is herein disclosed embodied in a preferred form in a milling machine which may be of ordinary description comprising a base support, a transversely movable saddle support including a swivel mounting, and a longitudinally movable work support or table. In the illustrated machine, the work table is arranged to be power driven through conventionally arranged connections including a reversing clutch which is carried on the swivel portion of the saddle support, and has intermediate neutral and alternative driving positions. The driven element of the reversing clutch is connected through intervening gearing to a table feed screw rotatably supported on the table and arranged for engagement with a stationary nut in the saddle support. Manual operation of the table is effected by means of a hand wheel sleeved upon and having a clutch connection with an extension of the feed screw at one end of the table support.

With the construction and arrangement of the support actuating mechanism above described, in which the hand wheel or equivalent manual actuating element is located at one end of the moving table support, and may be either rigidly secured or clutched to turn with the table feed screw, whereas the power controls for the table support including the reversing clutch are mounted on a relatively stationary part of the machine, the hazard exists that the operator standing at one end of the machine may have his clothing caught in the hand wheel when he is too far removed from the usual starting and stopping lever to arrest the power operation of the machine.

It is a principal object of the present invention to provide an interlocking device for positively disconnecting the manual actuating element during power operation of the table support which is independent of any connection with the power controls for the support, and is therefore particularly adapted for use in an actuating mechanism having the manual actuating element and power operating control located in positions remote from one another and on relatively moving parts of the machine.

It is a further object of the inventiton to provide an interlocking device which is rendered operative by the application of power in the actuating mechanism for the table support to positively disconnect the manual actuating element from the support actuating mechanism.

It is another object of the invention to provide an interlocking device of this general description which acts automatically, whenever operative connection is established between the manual actuating element and the support actuating mechanism, to positively disconnect the support power driving mechanism therefrom.

It is another object of the invention to provide in a support actuating mechanism of this general description having alternatively available manual and power operated driving connections, an interlocking device embodying a subsidiary clutch mechanism which is responsive to the application of power through the connections to close the clutch, and which is further responsive to the manual operation of shifting the manual control element to its clutched position to disengage the subsidiary clutch independently of whether the support is at rest.

With these and other objects in view as may hereinafter appear, a feature of the invention consists in the provision of a subsidiary clutching device in the power driving connections to the table which is arranged to be shifted to driving position by the application of power through the power driving connections, and which is provided with an interlocking connection with the hand wheel which acts upon movement of the clutching device into driving position to disengage the hand wheel, and is further operative upon movement of the hand wheel into engaging position to disengage the clutch.

Other features of the invention relate more specifically to details in the construction and arrangement of the auxiliary clutch which is particularly adapted to permit an easy and rapid movement of the clutch from one to the other of its alternative clutching and disengaged positions under conditions of alternative hand and power operation.

The several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a sectional view taken on the line 1—1 of Fig. 2, and illustrates particularly the driving connections for the work table in a milling machine of ordinary description;

Fig. 2 is a detail end view illustrating a portion of the work table, and more particularly the hand wheel at the left hand end of the table; Fig. 3 is an enlarged detail view in section, of the auxiliary clutch in the power driving connections for the table illustrated in Fig. 1; Fig. 4 is a detail sectional view taken on the line 4—4 of Fig. 3, showing particularly the auxiliary clutch member; Fig. 5 is a detail sectional view taken on the line 5—5 of Fig. 3, illustrating particularly the relatively stationary face cam which cooperates with the spring plungers in the auxiliary clutch member to engage the auxiliary clutch upon application of power through the power driving connections; Fig. 6 is a developed view showing the relationship of the auxiliary clutch member with its closing cam and cam plungers, the clutch being shown in its engaging position and with the plungers riding on the points of the engaging cam; and Fig. 7 is a developed view illustrating the same parts, but in an alternative position in which the auxiliary clutch member has been moved to its open position through the engagement of the table hand wheel.

While the invention is herein illustrated in a preferred form as embodied in an actuating mechanism of the feed screw and nut type for reciprocating the work support of a milling machine, it will be understood that the several features of the invention in their broader aspects may be equally well applied to actuating mechanisms of specifically different types embodying therein alternatively available manual and power operated connections, and adapted for operating machine tool supports generally.

Referring specifically to the drawing, the work support or table of a milling machine which may be of ordinary description is designated at 10 slidably supported in ways 12 on a swivel mounting 14 on a saddle support 16 which is supported for transverse movement in ways 18 carried on a base support 20.

Translatory movement of the work support 10 on its ways 12 is effected by actuating mechanism of ordinary description including a feed screw 22 rotatably supported in the work support 10 and having screw-threaded engagement with a nut 24 rigidly secured to the swivel mounting 14. The feed screw 22 is rigidly supported against axial movement with relation to the work support 10 by means of end thrust bearings 26 mounted on a reduced portion of the feed screw shaft and arranged for engagement against opposite sides of a lug 28 fixed to the under side of the table 10. A sleeve member 30 fixed to the reduced portion of the feed screw shaft 22 and rotatably supported within a sleeve bearing 32 formed in a depending lug 33 of the work support provides rotational support for the feed screw in the work support 10. As best shown in Fig. 1, the sleeve member 30 is keyed at its outer end to a spacer member 35. The spacer member 35 and a sleeve clutch element 34 are connected by means of a spline 36 to the feed screw shaft 22, so that both sleeve members 30 and 34 are rigidly connected to turn as a unit with the feed screw shaft 22.

The sleeve member 30 is supported against axial movement by means of a flange 38 formed on the sleeve 30 which engages between a flanged end of the bearing 32 and a ring member 40 secured to one face of the depending lug 33. The sleeve member 34 is held in position on the feed screw by means of a sleeve nut 44 screw-threaded to the outer end of the feed screw shaft 22.

For manual actuation of the work support, there is provided a hand wheel 46 which is loosely sleeved upon and is arranged for clutching engagement with the feed screw 22. The hand wheel 46 is provided with a socket-shaped hub portion in which is fitted a sleeve element 48. The hand wheel 46 and sleeve 48 are normally connected to move as a unit by means of a spring-pressed plunger 50 which is mounted in one of the radially extending arms of the hand wheel, and engages in a corresponding recess in the periphery of the sleeve member 48. The sleeve element 48 is loosely sleeved upon the sleeve nut 44, and is provided at its inner end with clutch teeth for engagement with the clutch toothed face of the sleeve element 34. Movement of the hand wheel 46 axially between the clutching and disengaged positions is limited by means of a stop screw 52 threaded in the sleeve 48 for engagement within an annular groove 54 in the sleeve nut 44.

Power operation of the work support is effected through driving connections which may be of ordinary description, comprising a vertical drive shaft 60 rotatably supported in a bearing 62 in the saddle support 16 concentric with the axis of rotation of the swivel mounting 14. The drive shaft 60 is driven from any source of power through connections (not shown) including a bevel gear 64 secured to the lower end of the shaft 60. At its upper end the shaft 60 is provided with a bevel gear 66 which meshes with and drives in opposite directions two bevel gears 68 and 70 which have formed on the inner faces thereof clutch teeth for engagement with an intermediate reversing clutch element 72. The bevel gears 68 and 70 are loosely sleeved on a drive shaft 74 carried by the work support 10, and are externally supported in bearings 76 and 78 on the swivel support 14. The reversing clutch member 72 is sleeved upon and is keyed to rotate with the driven shaft 74.

The position of the clutch member 72 is preferably controlled by means of a table reversing lever of ordinary description carried on the swivel mounting 14 at the front of the machine, but not here shown, and connections including a clutch shifting fork (also not shown) adapted for engagement with a peripheral groove designated at 80 in the clutch member 72.

The driven shaft 74 is arranged to move axially with the table support 10, and is supported at its left hand end in a rotational and end thrust sleeve bearing 82 in the depending bracket 33 of the table support 10. The feed screw is driven from the shaft 74 by means of a gear 84 on the shaft 74 which meshes with a gear 86 formed on a subsidiary clutch sleeve element 88 having on one face thereof clutch teeth arranged for engagement with cooperating clutch teeth formed in the adjacent end of the sleeve member 30.

In accordance with the present invention, the subsidiary clutch member 88 is arranged to be shifted automatically to clutching position upon the application of power through the driving connections to drive the work support, as when the reversing clutch 72 is engaged, and is further arranged to be readily disconnectible under the influence of an interlocking connection with the hand wheel 46 when that member is shifted to its clutching position. The interlocking connection referred to, consists of an axially shiftable control rod 90 which is supported within an axial bore in the feed screw shaft 22. One end of the rod 90 engages against the hub portion of the hand wheel 46. A cross pin 92 secured to the other end of the rod 90 is arranged to extend through a transverse slot in the feed screw shaft 22 into engagement with the auxiliary clutching member 88.

The mechanism for shifting the clutch member 88 to its clutching position upon the application of power through the driving connections, comprises three spring-pressed plungers 94 which are supported in axially extending recesses 96 in the clutch member 88 for engagement with a relatively stationary saw-toothed face cam 98. The cam 98 takes the form of a ring which is supported by ball bearings upon the feed screw shaft 22, and is further supported against axial as well as rotational movement by engagement of a pin 100 fixedly mounted on the table support in a recess 102 in the periphery of the face cam 98. The construction and arrangement of the auxiliary clutch member 88, spring-pressed plungers 94 and face cam 98 is such that application of power through the driving connections to rotate the auxiliary clutch member 88 will cause the clutch member to be forced yieldingly to the left into engagement with the cooperating clutch teeth on the sleeve member 30. It will be observed that the spring-pressed plungers 94 have the function of a safety device to permit delay in the movement of the clutch member 88 to its meshing position in the event that the opposing clutch teeth should first engage one another face to face. The movement of the clutch member 88 to the left will carry with it the rod 90 and hand wheel 46, thus disengaging the hand wheel. The auxiliary clutch element 88 will thereafter remain in its engaged position until it is positively disconnected through the actuation of the hand wheel 46.

It will be noted from an inspection of Figs. 5, 6 and 7, that the high points of the saw-toothed cam 98 are spaced relatively far apart as compared with the teeth of the auxiliary clutch member 88. This construction of the face cam 98 having the high points thereof relatively few in number, is of considerable value to insure an easy, effortless movement of the auxiliary clutch member 88 to its inactive position when it is desired to shift the hand wheel 46 into the clutching position shown in Fig. 1. The use of a face cam having a relatively small number of high points minimizes the chance that the clutch member 88 when disconnected from its power drive may stop in a position in which the high points of the cam are directly centered upon the pointed noses of the plungers 94 which would then resist the shifting of the hand wheel 46 to its engaged position.

The illustrated construction of the auxiliary clutch mechanism including the face cam 98 and spring-pressed plungers 94 is such as to provide a further factor of safety in the operation of the machine, in that movement of the hand wheel 46 to its clutching position during machine operation will operatively disconnect the power drive to the table. This movement of the hand wheel 46 would take place against the pressure of the spring-pressed plungers 94 which would be subjected to a series of hammer-like blows by the successive rise portions of the face cam 98 as the auxiliary clutch member continued to be driven from the power driving connections. This hammering action would, of course, continue either until the hand wheel 46 were released and permitted to return to its inactive position, or the table driving clutch 80 were shifted to its neutral position.

It will be understood that the invention is not limited to the specific embodiment shown, and that various deviations may be made therefrom without departing from the spirit and scope of the appended claims.

What is claimed is:

1. In a machine tool, the combination with a support assembly including a relatively stationary support, a support movable thereon, and actuating connections for the movable support, a power drive for the movable support including control means located on one of said supports to start and stop said connections from power operation, a manual actuating element located on the other of said supports connectible to actuate the support, and a device on said other support responsive to the transmission of a power torque through said connections to disconnect the manual actuating element.

2. In a machine tool, the combination with a driven support and actuating connections for the support, a power drive for the support including control means to start and stop said connections from power operation, a manual actuating element connectible to actuate the support, and means responsive to the transmission of a power torque through said connections to disconnect the manual actuating element.

3. In a machine tool, the combination with a driven support and actuating connections for the support, a power drive for the support including control means to start and stop said connections from power operation, a manual actuating element connectible for manually actuating said connections, a power transmission clutch in said connections, means responsive to the power actuation of said connections to close the clutch, and an interlock between said clutch and said manual actuating element rendered operative by the engagement of the one to disconnect the other of said clutch and manual actuating element.

4. In a machine tool, the combination with a driven support and its actuating screw, of power driving connections for the screw including means to start and stop the screw from power operation, a manual actuating element, means for clutching said manual actuating element to drive the screw, auxiliary clutching means in said power connections including means responsive to the transmission of a power torque through said clutching means to engage the same, and an interlock between said manual actuating element and said auxiliary clutching means whereby engagement of said auxiliary clutching means will disconnect the manual actuating element.

5. In a machine tool, the combination with a work support and its actuating screw, of a manual actuating element and clutching means for connecting said element to actuate the screw, power driving connections for the screw including means to start and stop the screw from power operation, an auxiliary clutch element shiftable to establish a driving connection between said power connections and the screw, a connection rendered operative by the transmission of a power torque to said auxiliary clutch element for yieldably shifting it into screw driving position, and an interlock between said manual actuating element and said auxiliary clutch element, whereby movement of either of said elements into clutching position moves the other of said elements out of clutching position.

6. In a milling machine, the combination with a work table and its actuating screw, of a hand wheel on the table connectible to actuate the screw, a support on which the table is mounted to slide, power driving connections for the screw including control means located on said support to start and stop the table from power operation, and an interlocking device including an element on the table responsive to the transmission of a driving impulse through the power driving connections to the actuating screw for operatively disconnecting the hand wheel therefrom.

7. In a milling machine having a reciprocable work table, the combination with a rotatable driving screw carried on the work table, a hand wheel supported co-axially with said screw, a hand wheel clutch, power driving connections for the screw including means for starting and stopping the screw from power operation, an auxiliary clutch element supported co-axially with the screw shiftable to establish a driving connection between said power connections and the screw, cam and follower means interposed between the clutch element and table and including a yieldable connection rendered operative by rotational movement of the clutch element to urge the same toward clutching position, and an interlock comprising a spacing element between said hand wheel and clutch member arranged to prevent simultaneous movement of said hand wheel and clutch member into clutching position.

8. In a machine tool, the combination with a driven support and its actuating screw, of power driving connections for the screw including means for starting and stopping the screw from power operation, a manual actuating element, and means for clutching said element to actuate the screw, an auxiliary clutch element in said power driving connections supported co-axially with the screw and shiftable thereon to establish a power driving connection with the screw, a stationary face cam on the support, cooperating spring-pressed plungers on the auxiliary clutch element for engagement therewith, said cam and plunger elements being rendered operative by the power actuation of said auxiliary clutch element and having a yielding action to engage the clutch, and an interlock between said auxiliary clutch element and manual actuating element whereby movement of either of said elements into clutching position moves the other of said elements out of clutching position.

9. In a machine tool, the combination with a support assembly including a relatively stationary support, a support movable thereon and actuating connections for the movable support originating in the stationary support and including a rotatable power transmitting member on the movable support, a power drive for the movable support including control means on the stationary support to start and stop said actuating connections from power operation, a manual actuating element on the movable support connectible to actuate the movable support, means responsive to the transmission of a power torque through said connections to shift said member axially, and an interlock between said member and manual actuating element whereby the shifting of said member is effective to disconnect the manual actuating element.

GEORGE B. HIRSCH.